(12) United States Patent
Makiuchi et al.

(10) Patent No.: US 8,081,622 B2
(45) Date of Patent: Dec. 20, 2011

(54) JITTER BUFFER CONTROLLER

(75) Inventors: Takashi Makiuchi, Fukuoka (JP);
Masanao Suzuki, Kawasaki (JP);
Takeshi Otani, Kawasaki (JP);
Masakiyo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 569 days.

(21) Appl. No.: 11/486,827

(22) Filed: Jul. 14, 2006

(65) Prior Publication Data

US 2007/0223467 A1    Sep. 27, 2007

(30) Foreign Application Priority Data

Mar. 22, 2006 (JP) ................. 2006-079006

(51) Int. Cl.
*H04L 12/66* (2006.01)
*H04L 12/50* (2006.01)
*H04L 12/28* (2006.01)
*H04L 12/54* (2006.01)
*H04J 3/06* (2006.01)

(52) U.S. Cl. ........ 370/352; 370/363; 370/412; 370/429; 370/516

(58) Field of Classification Search .................. 370/352, 370/353, 354, 356
See application file for complete search history.

(56) References Cited

U.S. PATENT DOCUMENTS

| | | | |
|---|---|---|---|
| 6,658,027 B1 | 12/2003 | Kramer et al. | 370/517 |
| 6,990,195 B1* | 1/2006 | LeBlanc et al. | 379/406.08 |
| 2002/0026310 A1 | 2/2002 | Mochida et al. | 704/201 |
| 2002/0064158 A1* | 5/2002 | Yokoyama et al. | 370/394 |
| 2003/0023428 A1* | 1/2003 | Chang et al. | 704/201 |
| 2005/0207437 A1* | 9/2005 | Spitzer | 370/412 |

FOREIGN PATENT DOCUMENTS

| | | | |
|---|---|---|---|
| GB | 2 356 537 | | 5/2001 |
| JP | 02183638 A | * | 7/1990 |
| JP | 2001-160826 | | 6/2001 |
| JP | 2002-164921 | | 6/2002 |
| JP | 2003-264583 | | 9/2003 |
| JP | 2005-229259 | | 8/2005 |
| WO | 2005/089158 | | 9/2005 |

OTHER PUBLICATIONS

English Abstract translation of JP 02183638 A, Inventor: Tanaka et al.*
European Search Report dated Jul. 20, 2009, from the corresponding European Application.
Notice of Reason for Rejection dated Sep. 14, 2010, from the corresponding Japanese Application.
Notice of Reason for Rejection dated Jan. 25, 2011, from the corresponding Japanese Application.

* cited by examiner

*Primary Examiner* — Daniel Ryman
*Assistant Examiner* — Thinh Tran
(74) *Attorney, Agent, or Firm* — Katten Muchin Rosenman LLP

(57) ABSTRACT

It is an object of this invention to improve speech quality in voice communications.

Provided is a jitter buffer controller for controlling a jitter buffer in which arrived packets are accumulated, including: a jitter measuring portion for measuring jitters in the arrived packets; a judging portion for judging whether or not the jitters of the packets can be absorbed with an accumulation capacity of the jitter buffer; a determining portion for determining levels of importance of the packets; and a control portion for performing reproduction processing or discarding processing on a packet, among the packets accumulated in the jitter buffer, having jitter that cannot be absorbed with the accumulation capacity of the buffer, depending on a level of importance of the packet.

16 Claims, 15 Drawing Sheets

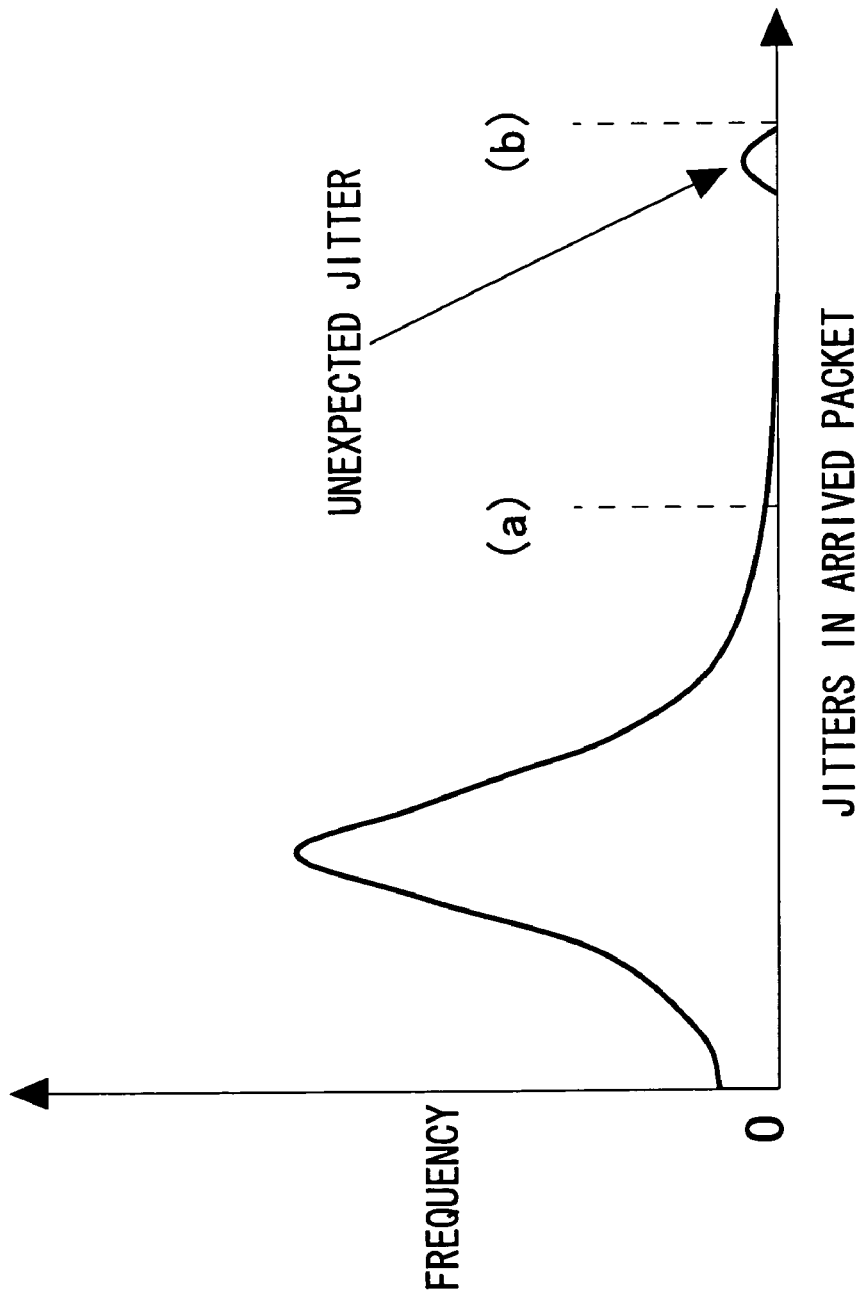

JITTER BUFFER CONTROLLER

BACKGROUND OF THE INVENTION

1. Technical Field

The present invention relates to a jitter buffer controller that can be adapted to a voice packet communication system, such as voice communications or VoIP (Voice over IP) using IP (Internet Protocol) network, in which voice is transformed into packets to be transmitted.

2. Background Art

In recent years, along with the rapid popularization of the Internet, VoIP communications has been receiving attention. In the VoIP communications, voice data is transformed into IP packets to be transmitted over an IP network. The IP network renders best-effort service, which means that a transmission bandwidth for voice transmission is not always secured contrary to the case of using a fixed telephone. Accordingly, there may occur jitters in packet arrival times due to network congestions and the like. Delays in the arrivals of voice packets due to the jitters cause discontinuity in voice reproduction on a receiver's side which has run out packets to be reproduced, resulting in deterioration of voice quality in communications. In the VoIP communications, a jitter buffer (hereinafter, referred to as "buffer") is provided on the receiver's side, which is shown in FIG. 12. The buffer once accumulates voice packets inputted at irregular intervals, and outputs the accumulated voice packets at regular intervals.

Packets are accumulated in the buffer in advance of reproduction, so packet reproduction can be continuously performed even when packets arrive with delay due to jitters, by reproducing the accumulated packets during the delay, to absorb the jitters to thereby attain stability in reproduction. It is possible to absorb jitters to a greater degree by increasing the number of packets to be accumulated in the buffer. However, as the number of packets to be accumulated increases, a longer delay also develops in transmitting the received packets, which impairs realtimeness in the communications.

As described above, if the number of the packets to be accumulated in the buffer is too small, it leads to deterioration of voice quality in communications, such as discontinuity in voice reproduction. The trade-off of increasing the number of packets to be accumulated is correspondingly longer delays to be developed in transmission. Therefore, it is necessary to optimize the number of packets to be accumulated in the buffer in accordance with jitters in the network such that the minimum number of packets for retaining voice quality in communications is accumulated, to thereby minimize the transmission delay resulting from packet accumulation in the buffer.

The Patent document 1 discloses a technique for minimizing the transmission delay by dynamically setting the number of packets to be accumulated in a buffer in accordance with jitters, with consideration given to influence on voice quality in communications.

FIG. 13 shows a structural diagram of the technique described in Patent document 1. Arrived packets are received to be sent to a jitter buffer and to a jitter measuring portion. The jitter measuring portion measures jitters in the arrived packets, and the jitter thus measured are sent to a reference value change determining portion. The reference value change determining portion receives current information on the accumulation capacity of the buffer from an accumulation capacity adjusting portion, and compares the information with the jitters measured by the jitter measuring portion. The reference value change determining portion determines a new accumulation capacity of the buffer based on the result of comparison, and notifies the accumulation capacity adjusting portion of the new accumulation capacity. On the other hand, a silence determining portion receives reproduced packets from the jitter buffer, determines whether the packets are silent or not, and notifies the accumulation capacity adjusting portion of the result of judgment. The accumulation capacity adjusting portion replicates or discards the silent packets based on the new capacity notified by the reference value change determining portion. The accumulation capacity adjusting portion also outputs voice signals to a reproduction device.

According to the prior art disclosed in Patent document 1, the jitters in the arrived packets are measured, based on which the accumulation capacity large enough to absorb the measured jitters is set for the buffer, and silent packets in the buffer are replicated or discarded so that the buffer accumulates packets at the set accumulation capacity, to thereby dynamically set the buffer accumulation capacity.

Patent document 2 discloses another technique for setting optimal buffer accumulation capacity for minimizing transmission delay while avoiding buffer underflow.

FIG. 14 is a structural diagram of the technique described in Patent document 2. Arrived packets are received to be sent to a jitter buffer and to a jitter measuring portion. The jitter measuring portion measures jitters in the arrived packets, and sends the result of measurement to a statistical processing portion. The statistical processing portion determines, based on a distribution of jitters, an accumulation capacity capable of absorbing the jitters, and notifies a reproduction control portion of the accumulation capacity. The reproduction control portion outputs a voice signal to a reproduction device.

According to the prior art disclosed in Patent document 2, jitters in the arrived packets are measured, and the statistical processing is performed thereon. Based on the distribution of the jitters obtained by the statistical processing, a maximum value of the jitters, with which buffer underflow is surely avoided according to the statistics, is determined, and an accumulation capacity capable of absorbing a jitter of the maximum value is set for the buffer.

[Patent document 1] JP 2001-160826 A
[Patent document 2] JP 2003-264583 A

SUMMARY OF THE INVENTION

Disclosure of the Invention

Problems to be Solved by the Invention

However, the techniques disclosed in Patent document 1 and Patent document 2 have the following problems.

According to the technique disclosed in Patent document 1, the accumulation capacity capable of absorbing the measured jitters is set for the buffer. Accordingly, with the jitter distribution of FIG. 15, it is sufficient to provide the buffer with the accumulation capacity of level (a) for absorbing most of the jitters. However, in reality, the buffer accumulation capacity of level (b) is set in order to absorb an unexpected jitter of larger degree occurring at low frequency, which may develop longer transmission delay.

According to a technique disclosed in Patent document 2, the buffer is provided with the accumulation capacity (of level (a) in FIG. 15) based on the jitter distribution. Therefore, arrived packets having jitters, which exceed the maximum level of the jitter ((a) in FIG. 15) determined based on the jitter distribution, are late for the timing of reproduction. In such the case, the reproduction is generally performed by replicating the preceding packets through silent reproduction, repeat reproduction, packet interpolation, or the like. Therefore, the reproduction control portion regards the voice packets, which arrived with the jitters exceeding the maximum value of the jitter, as packets of delay, and discards the packets. There is no consideration given to an influence, which may be exerted on voice quality in communications due to the discard of the voice packets. Accordingly, there is a fear that voice quality in communications be deteriorated by discarding packets which correspond to a turning point of voice or the like and thus has a great influence on voice quality in communications.

Therefore, the present invention has an object to improve speech quality, which includes to improve voice quality of communications and to reduce transmission delay, in voice communications.

Means for Solving the Problems

In order to solve the above-described problems, the present invention adopts the means as follows. That is, according to an aspect of the present invention, there is provided a jitter buffer controller for controlling a jitter buffer in which arrived packets are accumulated, including:

a jitter measuring portion for measuring jitters in the arrived packets;

a judging portion for judging whether or not the jitters of the packets can be absorbed with an accumulation capacity of the jitter buffer;

a determining portion for determining levels of importance of the packets; and a control portion for performing reproduction processing or discarding processing on a packet, among the packets accumulated in the jitter buffer, having jitters that cannot be absorbed with the accumulation capacity of the buffer, depending on a level of importance of the packet.

With this configuration, it is possible to decide whether packets arrived with delay need to be discarded or not depending on levels of importance of the packets determined, rather than to discard, without exception, any packet arrived with delay. Even if packets of high importance arrive with delay, the packets are assured of the reproduction thereof, which prevents deterioration in voice quality in communications, to thereby improve speech quality.

Also, the jitter buffer controller according to another aspect of the present invention, further includes an accumulation capacity determining portion for determining a packet accumulation capacity in accordance with a jitter distribution obtained by the measuring portion relating to a plurality of packets;

in which the control portion replicates or discards, in accordance with the packet accumulation capacity determined, packets attached with low importance.

With this configuration, an accumulation capacity can be dynamically changed to an optimal amount in accordance with a jitter distribution of packets. Therefore, it is possible to decide an optimal packet accumulation capacity depending on the situation in a network so as to minimize transmission delay, to thereby improve speech quality.

In addition, the present invention can be attained as a jitter buffer control method possessing the same characteristics as the jitter buffer controller according to the present invention described above.

Effects of the Invention

According to the present invention, it is possible to improve speech quality.

BRIEF DESCRIPTION OF THE DRAWINGS

FIG. 15 is a diagram showing a jitter distribution.

DETAILED DESCRIPTION OF THE INVENTION

Best Mode of Carrying Out the Invention

Hereinafter, embodiments of the present invention will be explained with reference to the accompanying drawings. The embodiments are merely examples, and the present invention is not limited to structures of the embodiments.

First Embodiment

System Structure

Figure 1:
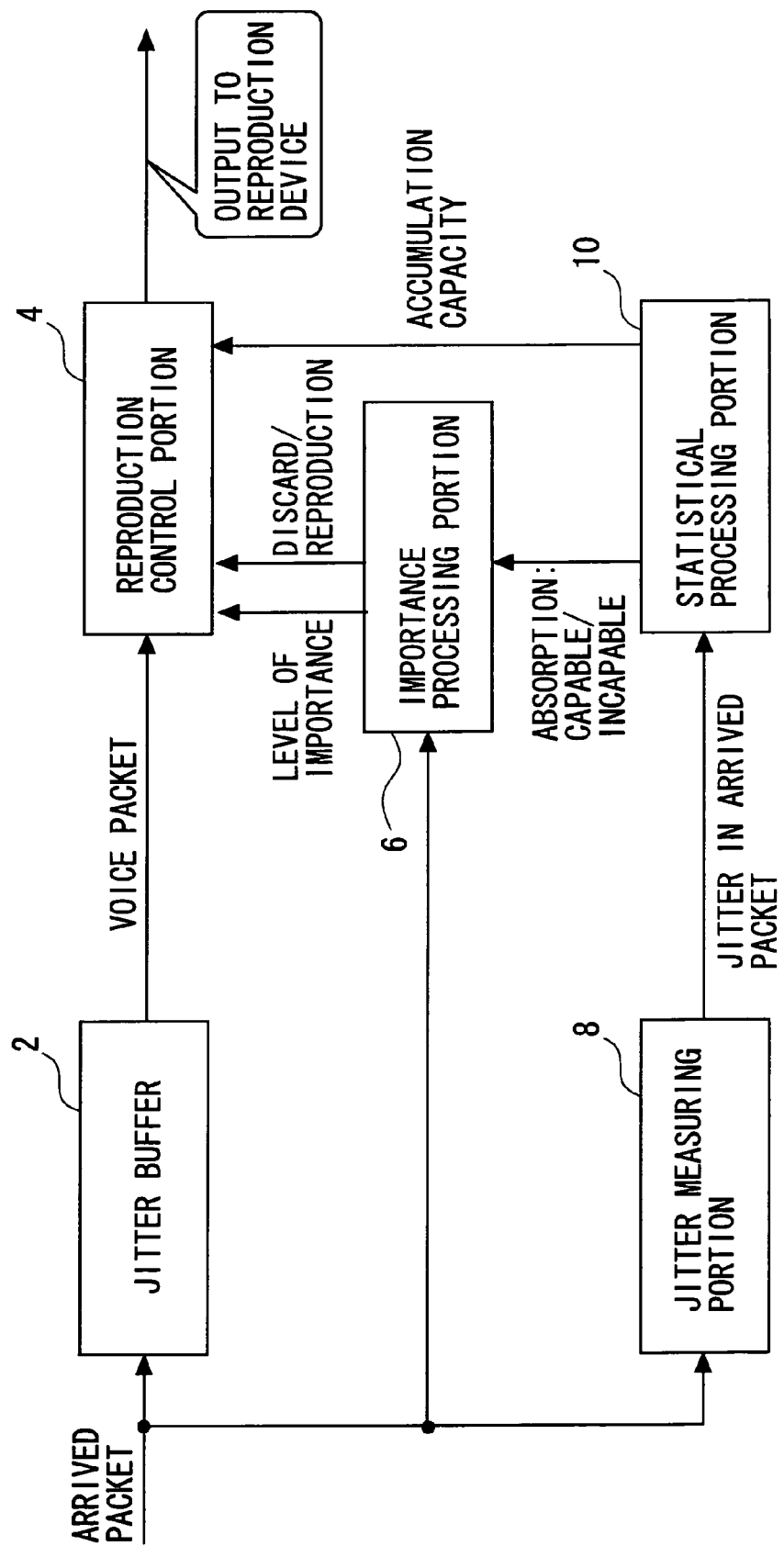
FIG. 1 is a diagram showing an exemplary configuration of a jitter buffer controller.

FIG. 1 is a diagram showing an exemplary configuration of a jitter buffer controller for absorbing jitters in voice packets according to a first embodiment of the present invention. The jitter buffer controller is provided, for example, between a reception device and reproduction device for voice packets. In FIG. 1, the jitter buffer controller includes: a jitter buffer 2 in which arrived packets are accumulated; a reproduction control portion 4 for outputting voice signals to the reproduction device; an importance processing portion 6 for determining levels of importance of the packets; a jitter measuring portion 8; and a statistical processing portion 10.

Voice packets are inputted, upon arrival, to the jitter buffer 2, to the importance processing portion 6, and to the jitter measuring portion 8, as arrived packets.

Further, an orthogonal transformation is performed on a decoded voice signal, and a level of importance of the voice signal is determined based on variation in Spectral Power.

The jitter measuring portion 8 measures jitters in the arrived packets, and notifies the statistical processing portion 10 of the jitters.

The statistical processing portion 10 compares the measured jitters with a past distribution of jitters to determine whether or not the jitter buffer with a current capacity level is capable of absorbing the measured jitters (whether or not the arrived packets are to be discarded as packets of delay), and notifies the importance processing portion 6 of the result of determination. The statistical processing portion 10 also executes statistical processing on the measured jitters to obtain a new jitter distribution, and notifies the reproduction control portion 4 of an optimal accumulation capacity for the jitter buffer.

The importance processing portion 6 determines levels of importance of the arrived packets, and notifies the reproduction control portion 4 of the levels of importance. The importance processing portion 6 instructs the reproduction control portion 4 to discard voice packets of low importance, and reproduce voice packets of high importance, based on the levels of importance determined, on condition that the reproduction control portion 4 is informed by the statistical processing portion 10 that the buffer is incapable of absorbing the jitters of the arrived packets.

The jitter buffer 2 stores (accumulates) voice packets that arrived, and the reproduction control portion 4 reads out the voice packets.

The reproduction control portion 4 reads out voice packets from the jitter buffer 2 at regular intervals, and outputs voice signals to a reproduction device. In the course of this process, the reproduction control portion 4 discards or replicates voice packets of low importance based on the result given by the importance processing portion 6 to bring the number of packets to be accumulated in the jitter buffer 2 in line with the accumulation capacity of the buffer notified by the statistical processing portion 10. When there are packets arriving with delay, the reproduction control portion 4 discards or reproduces the packets arrived with delay in accordance with an instruction from the importance processing portion 6.

Hereafter, each of the constituent elements will be explained in detail.

Jitter Measuring Portion

The jitter measuring portion 8 records the times of reception of the arrived packets.

The jitter measuring portion 8 uses Equation 1 to calculate an average packet reception interval (ave_recv_int) based on the records of the times of reception of the packets received in the past (recv_time(t−i)).

$$\text{ave\_recv\_int} = \frac{\sum_{i=1}^{n-1}\left\{\begin{array}{l}\text{recv\_time}(t-i) - \\ \text{recv\_time}(t-(i+1))\end{array}\right\}}{n-1}$$

$$= \frac{\text{recv\_time}(t-1) - \text{recv\_time}(t-n)}{n-1}$$

[Equation 1]

In Equation 1, "t" represents a sequence number of a most-recently-arrived packet.

The average packet reception interval can be obtained every time a packet arrives or once every predetermined times packets arrive. The number of packets, based on which the average packet reception interval is calculated, can be determined arbitrarily. A reference packet can be selected arbitrarily.

Also, the jitter measuring portion 8 uses Equation 2 below to calculate jitters (jit) in arrived packets based on the times of reception of the packets and the average packet reception intervals.

$$\text{jit} = \text{recv\_time}(t) - (\text{ref\_recv\_time} + \text{seq\_diff} \cdot \text{ave\_recv\_int})$$

[Equation 2]

In Equation 2, "ref_recv_time" represents a time of reception of a reference packet, and "seq_diff" represents a difference in sequence numbers of the reference packet and of the arrived packet.

The jitter measuring portion 8 notifies the statistical processing portion 10 of the calculated jitters of the arrived packets.

Statistical Processing Portion

Figure 2:
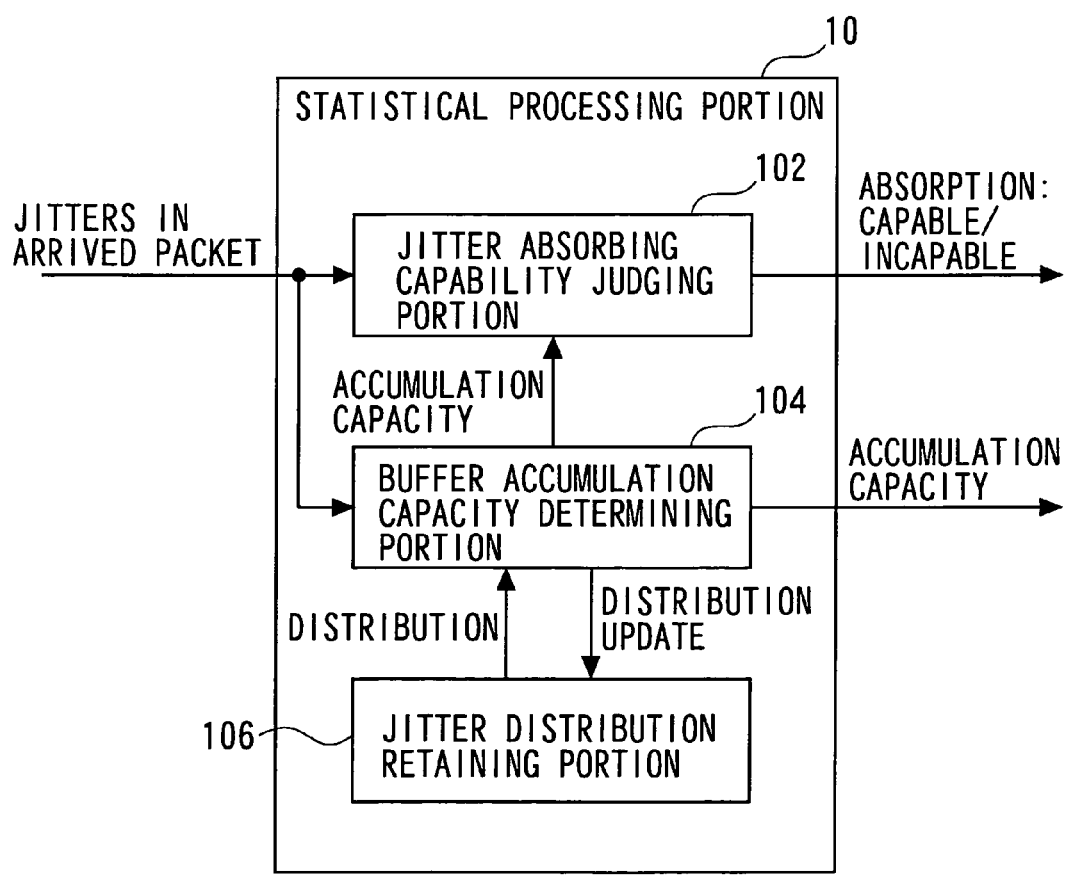
FIG. 2 is a diagram showing a statistical processing portion of the jitter buffer controller.

FIG. 2 is a diagram showing an exemplary configuration of the statistical processing portion 10. The statistical processing portion 10 includes a jitter absorbing capability judging portion 102, a buffer accumulation capacity determining portion 104, and a jitter distribution retaining portion 106.

(Jitter Absorbing Capability Judging Portion)

The jitter absorbing capability judging portion 102 compares the jitters of the arrived packets notified by the jitter measuring portion 8 with the current accumulation capacity which is previously set for the buffer, and judges whether or not the current accumulation capacity is capable of absorbing the jitter in the arrived packet (see FIG. 2), and notifies the importance processing portion 6 of the result of judgment. The buffer accumulation capacity determining portion 104 notifies the jitter absorbing capability judging portion 102 of the accumulation capacity of the buffer.

Figure 3:
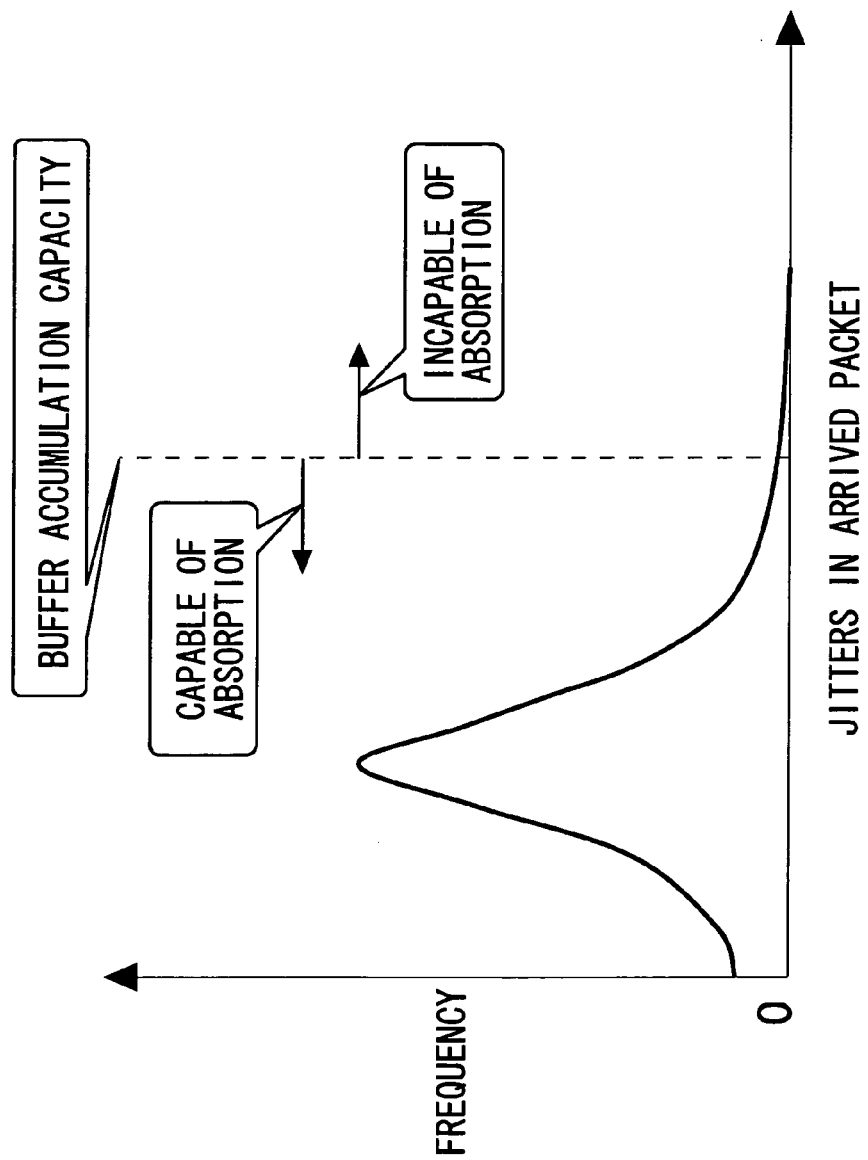
FIG. 3 is a diagram for explaining jitter absorbing capability judgement.

FIG. 3 shows a jitter distribution of the arrived packets. The lateral axis indicates jitters in the arrived packets (in terms of time), and the longitudinal axis indicates a frequency with which the jitters occur. The dotted line represents a current accumulation capacity of the buffer. The buffer can absorb jitters to a degree equal to or lower than the buffer accumulation capacity thereof, but cannot absorb jitters that exceed the buffer accumulation capacity thereof.

(Buffer Accumulation Capacity Determining Portion)

The buffer accumulation capacity determining portion 104 obtains a new jitter distribution based on the jitters of the arrived packets and on the jitters that relate to the previously received packets and are retained in the jitter distribution retaining portion 106, and determines an accumulation capacity of the buffer so that the buffer can absorb jitters maximum in value occurring at a frequency of a certain threshold and above. The buffer accumulation capacity determining portion 104 notifies the reproduction control portion 4 and the jitter absorbing capability judging portion 102 of the new accumulation capacity of the buffer.

The buffer accumulation capacity determining portion 104 notifies the jitter distribution retaining portion 106 of the new jitter distribution.

(Jitter Distribution Retaining Portion)

The jitter distribution retaining portion 106 retains a jitter distribution that relates to the arrived packets received in the past, and also retains the new jitter distribution notified by the buffer accumulation capacity determining portion 104.

Importance Processing Portion

Figure 4:
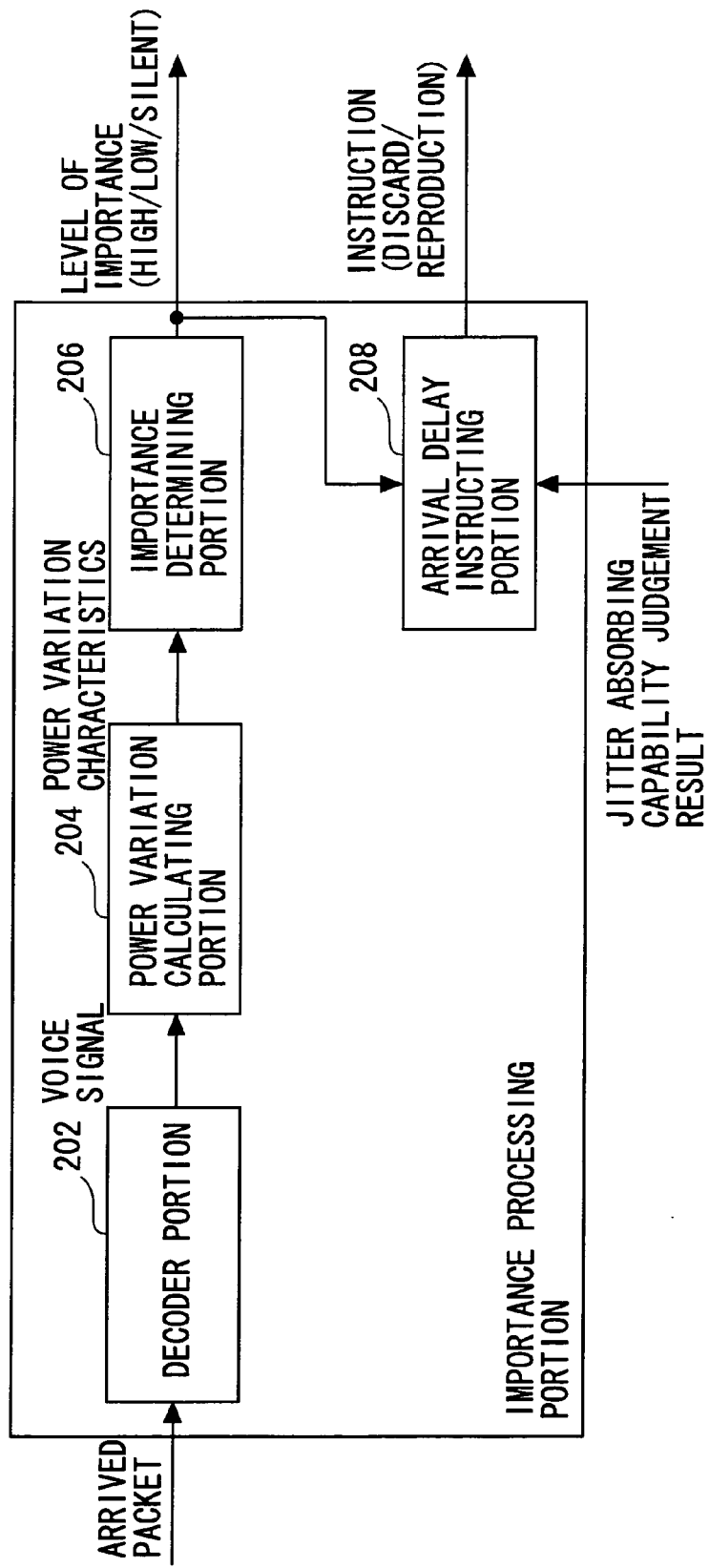
FIG. 4 is a diagram showing an exemplary configuration of an importance processing portion of the jitter buffer controller.

FIG. 4 is a diagram showing an exemplary configuration of the importance processing portion 6. The importance processing portion 6 includes a decoder portion 202, a power variation calculating portion 204, an importance determining portion 206, and an arrival delay instructing portion 208.

(Decoder Portion)

The decoder portion 202 decodes encoded data in the arrived packets to convert the data into voice signals. The decoder portion 202 notifies the power variation calculating portion 204 of the voice signals obtained through the decoding.

(Power Variation Calculating Portion)

The power variation calculating portion 204 uses Equation 3 to calculate power (pow(i)) of a current frame based on the voice signals obtained through the decoding.

$$pow(i) = \sum_{n=1}^{num\_sample} (s\_val(n))^2 \quad \text{[Equation 3]}$$

In Equation 3, "s_val(n)" indicates a sample value, and "num_sample" indicates the number of samples in the frame. Equation 4 is used to obtain "s_pow", which represents power variation characteristics of the current frame, based on the power "pow(i)" of the current frame and (N−1) past frames.

$$s\_pow = \frac{\sum_{i=1}^{N} |ave\_pow - pow(i)|}{N \times ave\_pow} \quad \text{[Equation 4]}$$

Here, "ave_pow" represents an average of the powers of the current frame and the past (N−1) frames as shown in Equation 5 below.

$$ave\_pow = \frac{\sum_{i=1}^{N} pow(i)}{N} \quad \text{[Equation 5]}$$

The power variation calculating portion 204 notifies the importance determining portion 206 of the calculated power of the voice signals and the calculated power variation characteristics.

Another calculation method may also be employed to calculate the power variation characteristics. For example, it is possible to calculate the power variation characteristics by obtaining a standard deviation, on the assumption that a power distribution has an appropriate distribution (such as a normal distribution).

(Importance Determining Portion)

The importance determining portion 206 determines importance of the current frame based on the data given by the power variation calculating portion 204, and notifies the reproduction control portion 4 of the result of determination.

Figure 5:
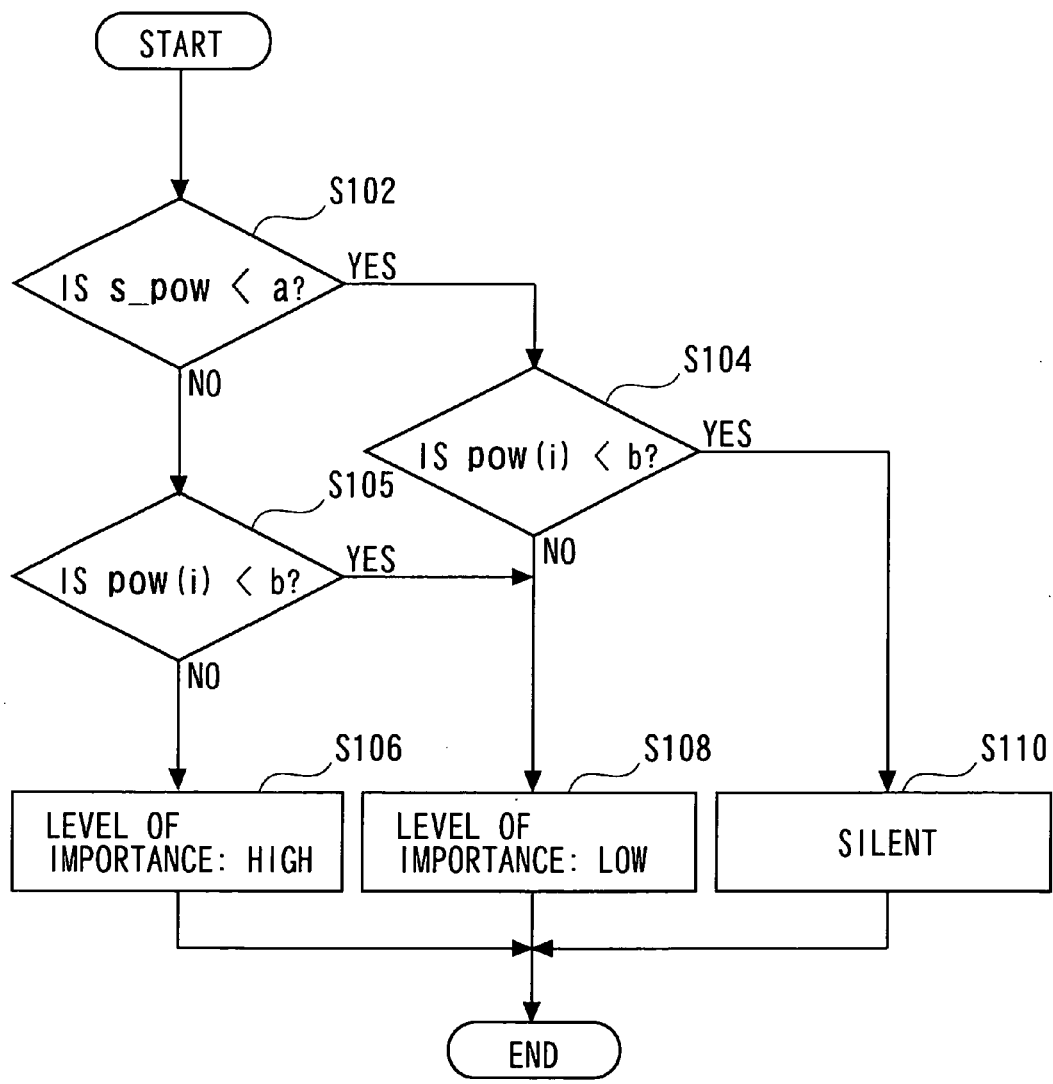
FIG. 5 is a diagram showing an operational flow in determining importance.

FIG. 5 shows an operational flow in determining importance. The processing of FIG. 5 is executed for each frame. The importance determining portion 206 determines whether the power variation characteristics of the voice signals informed by the power variation calculating portion 204 have a value equal to or lager than a threshold "a", or less than the threshold "a" (S102). When the power variation characteristics have a value equal to or larger than the threshold "a" ("NO" in S102), the importance determining portion 206 then determines whether the power has a value equal to or larger than a threshold "b", or less than the threshold "b" (S105). When the power has a value equal to or larger than the threshold "b" ("NO" in S105), the importance of the voice signals is judged as being high (S106). When the power has a value less than the threshold "b" ("YES" in S105), the importance of the voice signals are judged as being low (S108). When the power variation characteristics has a value less than the threshold "a" ("YES" in S102), the importance determining portion 206 determines whether the power has a value equal to or higher than the threshold "b", or less than the threshold "b" (S104). When the power has a value equal to or larger than the threshold "b" ("NO" in S104), the importance of the voice signals are judged as being low (S108). When the power has a value less than the threshold "b" ("YES" in S104), the voice signals are judged as being silent (S110).

Figure 6:
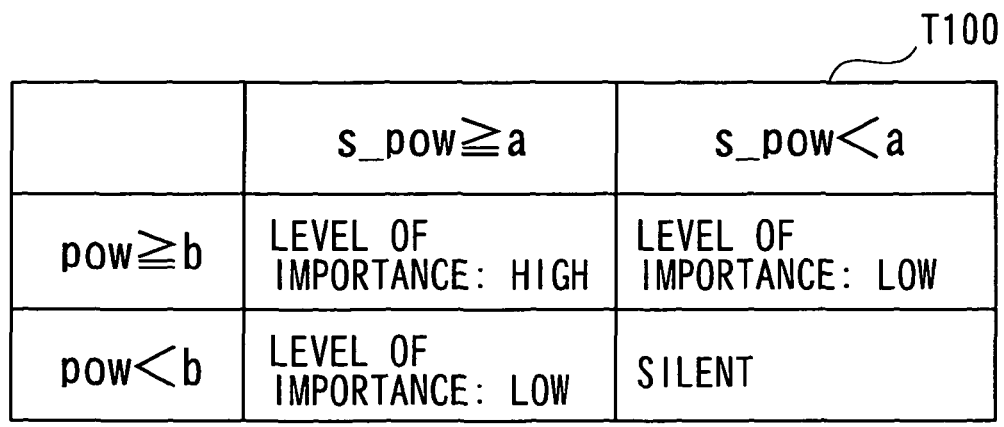
FIG. 6 is a diagram showing a table used for determining importance.

In summary, levels of importance of voice signals are determined as shown in FIG. 6. That is, the importance determining portion 206 determines that:

(1) the importance is high when the power variation characteristics have a value equal to or larger than the threshold "a" and the power has a value equal to or larger than the threshold "b";

(2) the importance is low when the power variation characteristics have a value less than the threshold "a" and the power has a value equal to or larger than the threshold "b";

(3) the importance is low when the power variation characteristics have a value equal to or larger than the threshold "a" and the power has a value less than the threshold "b"; and (4) the voice signal is silent when the power variation characteristics has a value less than the threshold "a" and the power has a value less than the threshold "b". The importance determining portion 206 notifies the reproduction control portion 4 of the result of determination.

In this embodiment, voice signals obtained through decoding are used for determining importance, but encoded data may also be used for determining importance. For example, data characteristics, which varies depending on levels of importance, are stored in a table beforehand, and the importance of the current packet (encoded data) can be determined by referring to the table.

(Arrival Delay Instruction Portion)

The arrival delay instructing portion 208 decides whether to discard or to reproduce the voice signals, based on the result of determination given by the importance determining portion 206, on condition that the statistical processing portion 10 notifies that the buffer cannot absorb the jitters. That is, when the voice signals are attached with high level of importance, the arrival delay instructing portion 208 instructs the reproduction control portion 4 to reproduce the voice signals arrived with delay. When the voice signals are attached with low importance or when the voice signals are silent, the arrival delay instructing portion 208 instructs the reproduction control portion 4 to discard the voice signals arrived with delay.

Jitter Buffer

The jitter buffer 2 accumulates the arrived packets in order by sequence number, and the arrived packets are read out under control of the reproduction control portion 4. The accumulation capacity of the buffer can be increased or decreased under packet control performed by the reproduction control portion 4 which is provided in a subsequent stage of the jitter buffer 2.

Reproduction Control Portion

Figure 7:
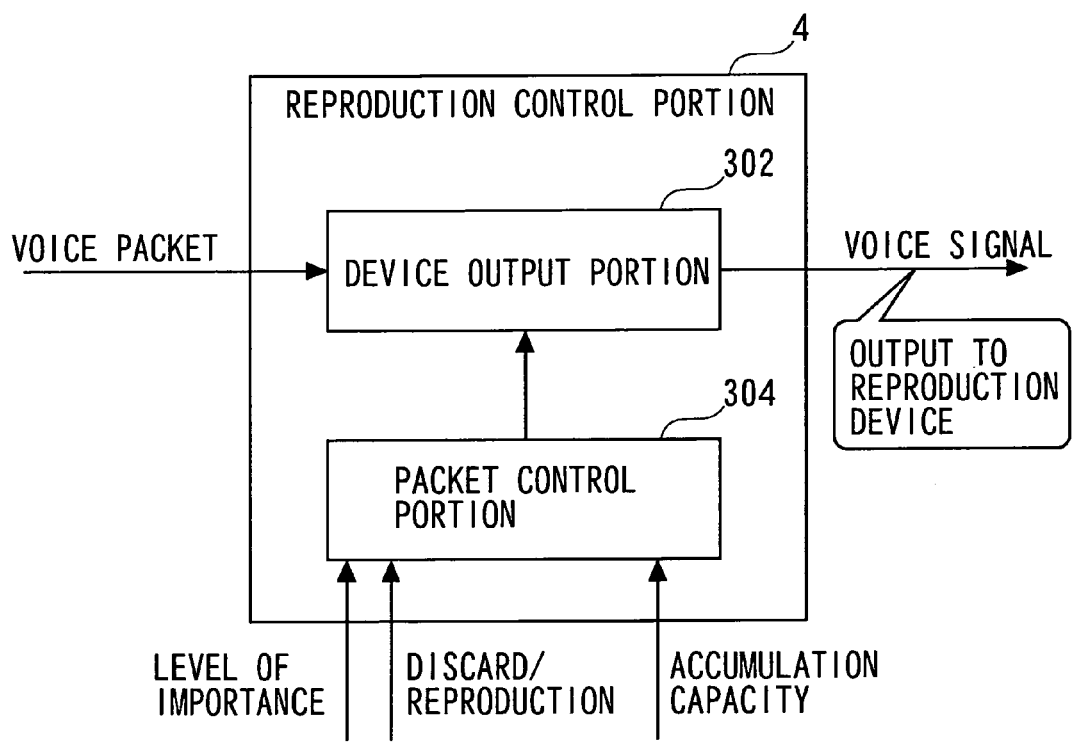
FIG. 7 is a diagram showing an exemplary configuration of a reproduction control portion of the jitter buffer controller.

FIG. 7 is a diagram showing an exemplary configuration of the reproduction control portion 4. The reproduction control portion 4 includes a device output portion 302 and a packet control portion 304.

(Device Output Portion)

The device output portion 302 regularly outputs voice signals obtained from the voice packets to the reproduction device so as not to cause discontinuity in voice reproduction. The device output portion 302, as long as no instruction is given by the packet control portion 304 to reproduce or discard packets, reads out the packets (voice packets) accumulated in the jitter buffer 2, decodes the packets to obtain voice signals, and outputs the voice signals to the reproduction device. When being instructed to reproduce or discard packets, the device output portion 302 reproduces the packets (by replicating and outputting the previously received packet) or discards the packets.

(Packet Control Portion)

When the accumulation capacity of the buffer is changed according to a notification from the statistical processing portion 10, the packet control portion 304 instructs, in accordance with a notification from the importance processing portion 6, the device output portion 302 to replicate or discard packets so the accumulation capacity of the buffer can be adjusted to have the notified value. That is, when the accumulation capacity of the buffer is instructed to be increased, the packet control portion 304 instructs the device output portion 302 to repeat reproduction of packets by replicating packets of low importance or of silence (to generate and output voice signals). As a result, the accumulation capacity of the buffer increases. When the accumulation capacity of the buffer is instructed to be decreased, the packet control portion 304 instructs the device output portion 302 to discard a voice packet of silence read out from the jitter buffer 2 and to reproduce the next voice packet. At this time, the packet control portion 304 may also instruct the device output portion 302 to discard voice packets of low importance. As a result, the accumulation capacity of the buffer decreases. A level of importance for each packet is informed by the importance processing portion 6.

When the importance processing portion 6 instructs the packet control portion 304 to reproduce voice signals which arrived with delay but are attached with high importance, the packet control portion 304 instructs the device output portion 302 to reproduce the voice signals. When the importance processing portion 6 instructs the packet control portion 304 to discard voice signals which arrived with delay and are attached with low importance (or voice signals of silence), the packet control portion 304 instructs the device output portion 302 to discard the voice signals.

It should be noted that the packet control portion 304 does not discard or replicate a voice packet that follows the replicated or discarded voice packet, because there is a fear that a successive discard or replication of voice packets may cause deterioration in voice quality in communications.

Effect of the First Embodiment

According to the jitter buffer controller of the first embodiment described above, the importance processing portion 6 determines the level of importance of each voice packet accumulated in the jitter buffer 2. At this time, the importance processing portion 6 decides, with regards to voice packets with jitters which are determined by the statistical processing portion 10 as being incapable of absorption with the accumulation capacity of the jitter buffer 2, whether to reproduce or to discard the voice packets. When the voice packets are attached with high importance, the importance processing portion 6 determines that the voice packets should be reproduced rather than being discarded, and when the voice packets are attached with low importance, the importance processing portion 6 determines that the voice packets should be discarded.

The reproduction control portion 4 executes processing on voice packets read out from the jitter buffer 2, according to the levels of importance of the voice packets notified by the importance processing portion 6 along with the instruction to discard or reproduce the voice packets. Accordingly, the voice packets with jitters incapable of absorption with the packet accumulation capacity but being attached with high importance are reproduced without being discarded, with the result that no deterioration in voice quality of communications due to a discard of important voice packets is caused. In other words, speech quality is improved.

Further, in the jitter buffer controller, the statistical processing portion 10 determines the packet accumulation capacity in accordance with a jitter distribution, and the packet accumulation capacity is increased or decreased accordingly. On the other hand, the importance processing portion 6 determines whether voice packets accumulated in the jitter accumulation buffer is silent or not. In increasing the packet accumulation capacity, the reproduction control portion 4 reproduces voice packets of low importance or of silent by replicating the voice packets to thereby attain the increased packet accumulation capacity. In contrast to this, in decreasing the packet accumulation capacity, the reproduction control portion 4 discards voice packets of silence to attain the decreased packet accumulation capacity. In this manner, the packet accumulation capacity is increased or decreased (dynamically changed) in accordance with the jitter distribution, which can reduce a transmission delay to a minimum. Even in this case, voice packets of high importance are not subject to discard, which leads to an improvement in speech quality through voice reproduction based on voice packets of high importance.

Further, when a voice packet is replicated or discarded, another voice packet read out from the jitter buffer 2 following the replicated or discarded voice packet is not replicated or discarded even if the other voice packet is of low importance or of silence. Accordingly, no deterioration in voice quality of communications due to replication or discard of successive voice packets is caused.

According to this embodiment, the accumulation capacity of the buffer can be dynamically changed, which can reduce a transmission delay to a minimum. In order to change the accumulation capacity of the buffer, voice packets of low importance are replicated or discarded. In addition, voice packets of high importance are not discarded even if the voice packets arrive with delay. Accordingly, the voice quality in communications can be improved.

Second Embodiment

Next, a second embodiment according to the present invention will be described. The second embodiment has commonalities with the first embodiment. Accordingly, descriptions on the commonalities are omitted, and the dissimilarities from the first embodiment are mainly explained.

A system according to the second embodiment has the same structure as the first embodiment of FIG. 1. The importance processing portion 6 in the system of the second embodiment is different from that of the first embodiment in the points as follows.

Importance Processing Portion

Figure 8:
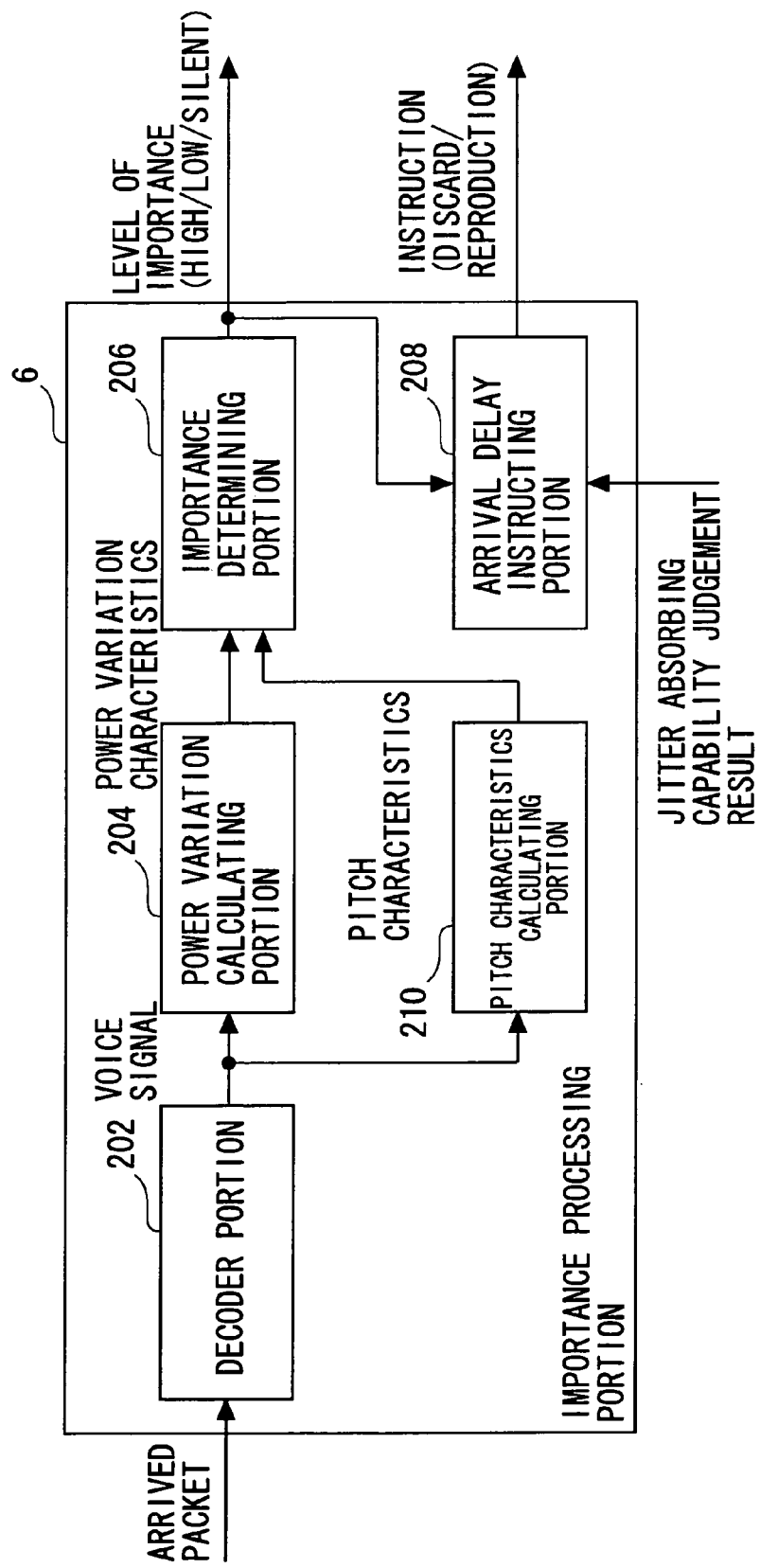
FIG. 8 is a diagram showing an exemplary configuration of an importance processing portion of the jitter buffer controller.

FIG. 8 is a diagram showing an exemplary configuration of the importance processing portion 6 according to the second embodiment. In FIG. 8, the same reference numerals are given to the same components as those of the first embodiment shown in FIG. 4. The importance processing portion 6 according to the second embodiment is different from the importance processing portion 6 of the first embodiment in that the importance processing portion 6 according to the second embodiment further includes a pitch characteristics calculating portion 210 besides the power variation calculating portion 204.

(Pitch Characteristics Calculating Portion)

The pitch characteristics calculation portion 210 calculates pitch characteristics of voice signals. Based on the obtained pitch characteristics, it is possible to determine whether a voice signal is monotonous having no change or the voice signal is changeful, with which a level of importance of the voice signal can be determined.

Figure 11:
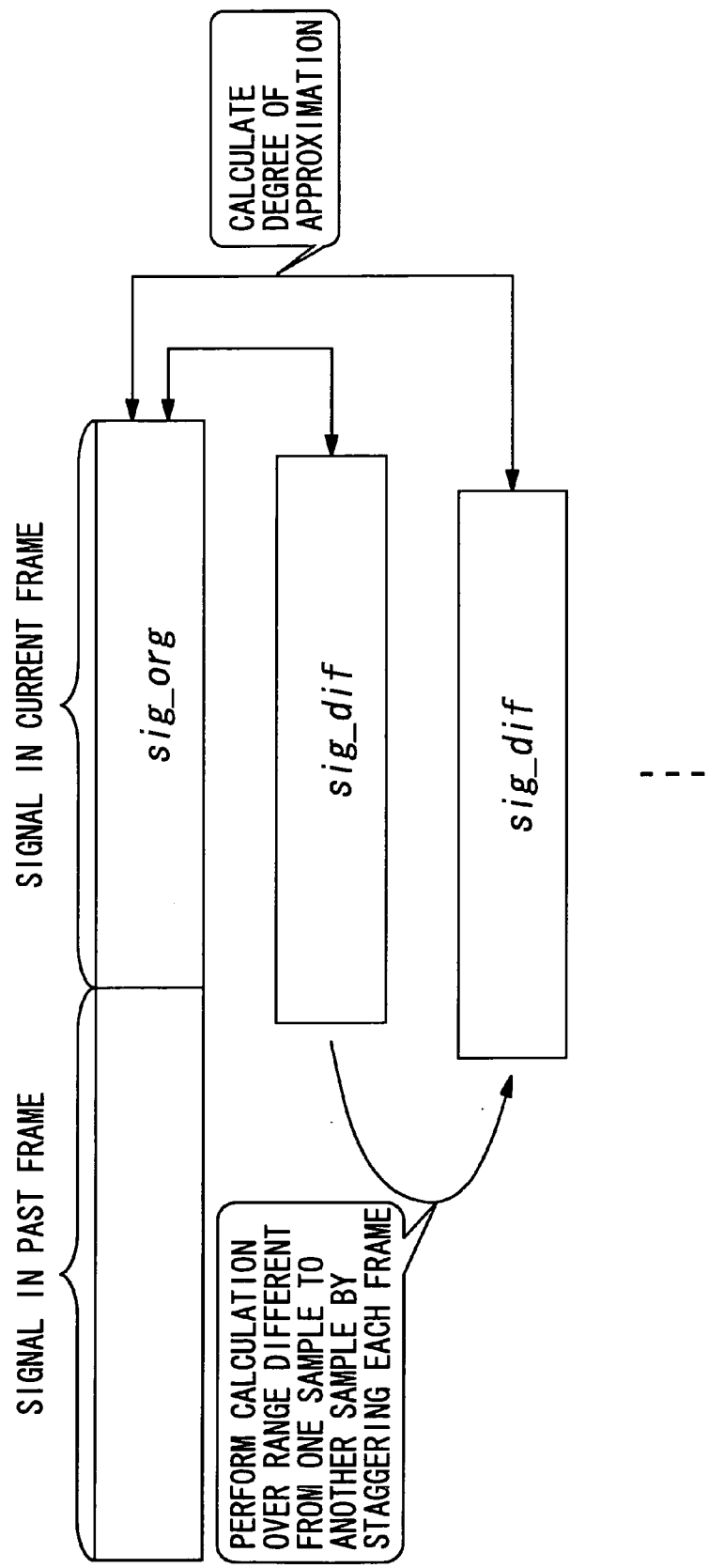
FIG. 11 is a diagram for explaining processing performed by a pitch characteristics calculation portion.
Figure 12:
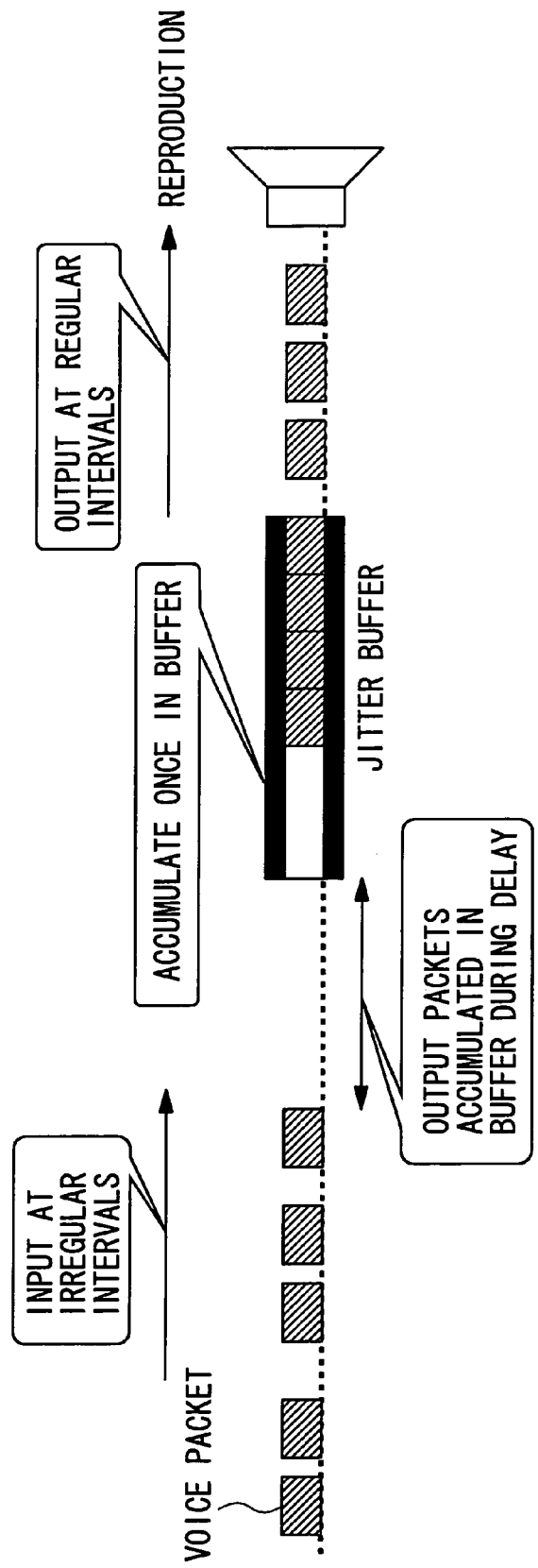
FIG. 12 is a diagram for explaining a jitter buffer.
Figure 13:
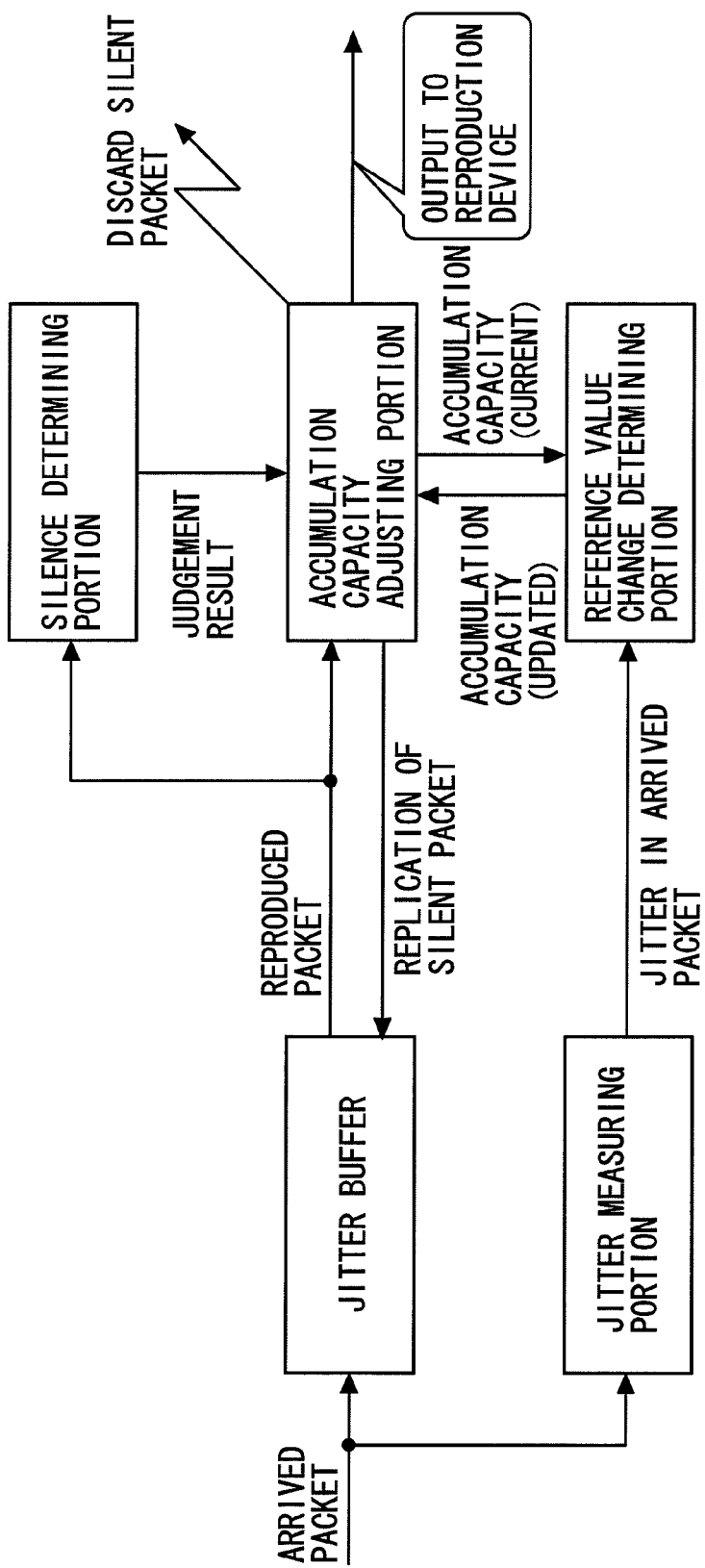
FIG. 13 is a diagram showing a system configuration according to Patent document 1.
Figure 14:
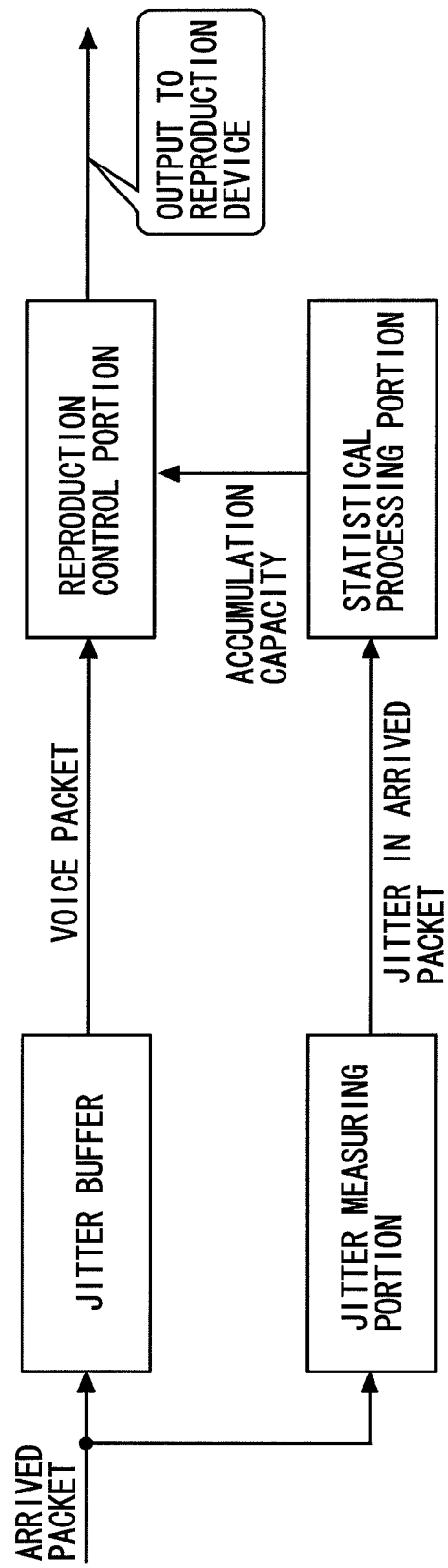
FIG. 14 is a diagram showing a system configuration according to Patent document 2.

FIG. 11 is a diagram showing calculation performed by the pitch characteristics calculating portion 210. As shown in FIG. 11, the pitch characteristics calculating portion 210 samples a current frame and a past frame and uses signals in each of the frames, and performs calculation on each sample based on Equation 6 over a range different from one frame to the other by staggering each frame to thereby obtain "apx" which represents a degree of approximation between the staggered signals (sig_dif) and the signals in the current frame (sig_org). The pitch characteristics calculating portion 210 further calculates a pitch gain (pgain), which is obtained at where the degree of approximation is maximum, by using Equation 7.

$$apx = \frac{\left(\sum (\text{sig\_org}(i) \times \text{sig\_dif}(i))\right)^2}{\sum \text{sig\_dif}(i)^2} \quad \text{[Equation 6]}$$

$$pgain = \frac{\sum (\text{sig\_org}(i) \times \text{max\_sig\_dif}(i))}{\sum \text{max\_sig\_dif}(i)} \quad \text{[Equation 7]}$$

Here, "max_sig_dif(i)" represents signals that produce a maximum degree of approximation.

At this time, signals with a pitch gain equal to or above the threshold are judged as having pitch characteristics, and signals with a pitch gain less than the threshold are judged as having no pitch characteristics.

The pitch characteristics calculating portion 210 notifies the importance determining portion 206 of the result of calculation as to whether or not the signals in the current frame have pitch characteristics.

When a voice packet has pitch characteristics, the voice packet does not correspond to a turning point of sound, which means that the same tone of voice continues. Therefore, the voice packet having pitch characteristics exerts not so much influence on reproduction/discarding of the voice packet, and the level of importance of the voice packet can be regarded as being low.

(Importance Determining Portion)

Importance determining portion 206 determines levels of importance of voice signals based on power variation characteristics and pitch characteristics of the current frame.

Figure 9:
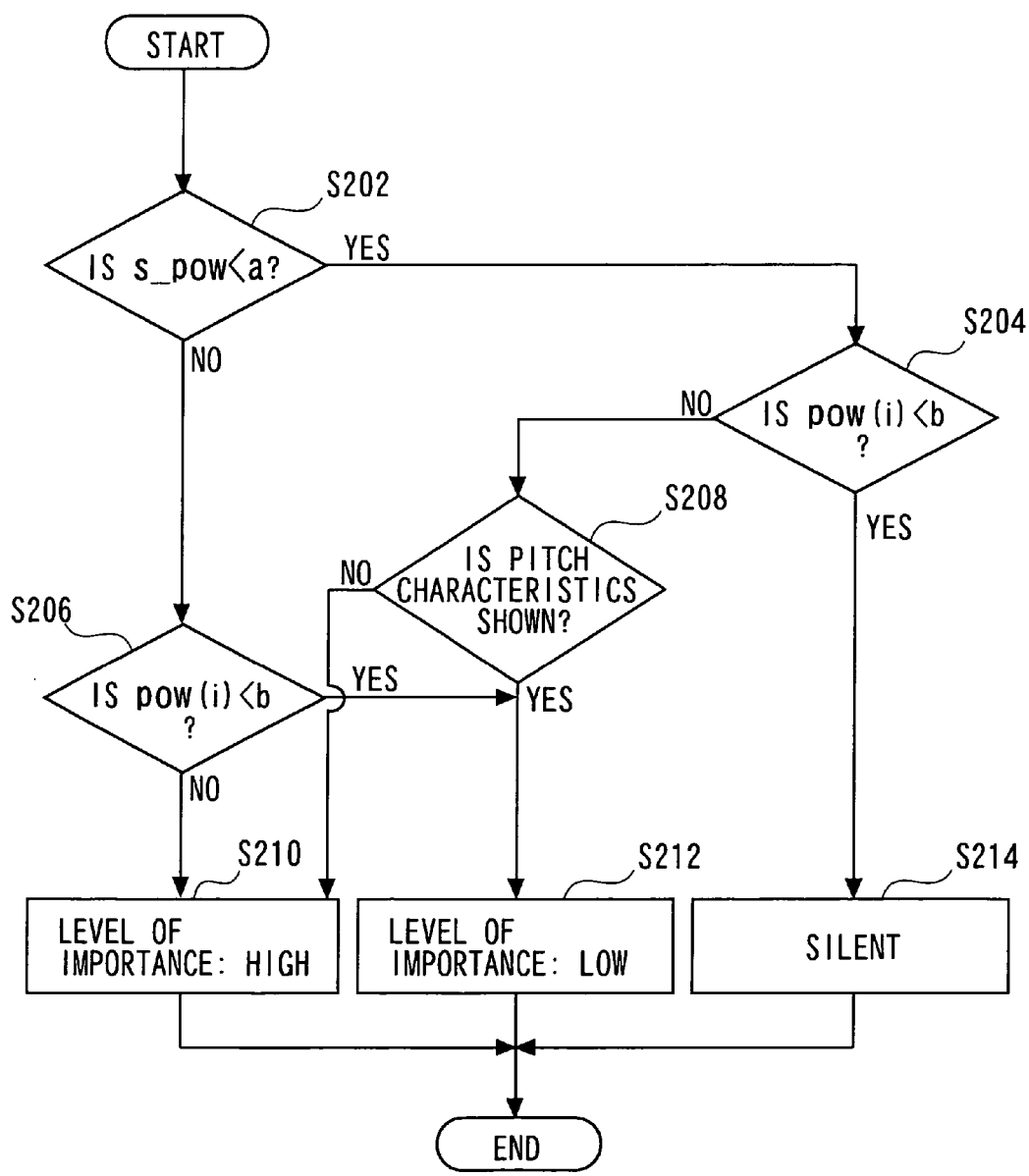
FIG. 9 is a diagram showing an operational flow in determining importance.

FIG. 9 shows an operational flow in determining importance. The importance determining portion 206 determines whether the power variation characteristics of a voice signal informed by the power variation calculating portion 204 has a value equal to or lager than a threshold "a", or less than the threshold "a" (S202). When the power variation characteristics has a value equal to or larger than the threshold "a" ("NO" in S202), the importance determining portion 206 then determines whether the power has a value equal to or larger than a threshold "b", or less than the threshold "b" (S206). When the power has a value equal to or larger than the threshold "b" ("NO" in S206), the importance of the voice signal is judged as being high (S210). When the power has a value less than the threshold "b" ("YES" in S206), the importance of the voice signal is judged as being low (S212). When the power variation characteristics has a value less than the threshold "a" ("YES" in S202), the importance determining portion 206 determines whether the power has a value equal to or higher than the threshold "b", or less than the threshold "b" (S204). When the power has a value equal to or larger than the threshold "b" ("NO" in S204), the importance determining portion 206 then determines whether the voice signal has pitch characteristics or not based on information given by the pitch characteristics calculating portion 210 (S208). When the voice signal has no pitch characteristics ("NO" in S208), importance of the voice signal is judged as being high (S210). On the other hand, when the voice signal has pitch characteristics ("YES" in S208), importance of the voice signal is judged as being low (S212). When the power has a value less than the threshold "b" ("YES" in S204), the voice signal is judged as being silent (S214).

Figure 10:
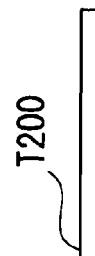
FIG. 10 is a diagram showing a table used for determining importance.

In summary, a level of importance of a signal is determined as shown in FIG. 10. That is, the importance determining portion 206 determines that:

(1) the importance is high when the power variation characteristics has a value equal to or larger than the threshold "a" and the power has a value equal to or larger than the threshold "b";

(2) the importance is high in a voice signal having no pitch characteristics, and the importance is low in a voice signal having pitch characteristics, on condition that the power variation characteristics has a value less than the threshold "a" and the power has a value equal to or lager than the threshold "b";

(3) the importance is low when the power variation characteristics has a value equal to or larger than the threshold "a" and the power has a value less than the threshold "b"; and (4) the voice signal is silent when the power variation characteristics has a value less than the threshold "a" and the power has a value less than the threshold "b". The importance determining portion 206 notifies the reproduction control portion 4 of the result of determination.

Effect of the Second Embodiment

According to the second embodiment described above, the importance processing portion 6 calculates pitch characteristics of voice packets, based on which levels of importance is determined. Accordingly, levels of importance is determined with higher accuracy.

A level of importance of a packet is determined based on whether or not the packet has pitch characteristics, which enables reproduction of a voice packet that corresponds to a turning point of sound without discarding the voice packet. Reproduction of a turning point of voice makes a reproduced voice clear, which helps smooth communications with the counterpart and thus improves speech quality.

[Others]

The disclosure of Japanese patent application No. JP2006-079006 filed on Mar. 22, 2006 including the specification, drawings and abstract are incorporated herein by reference.

What is claimed is:

1. A jitter buffer controller for controlling a jitter buffer in which packets are accumulated, including:
    a jitter measuring portion for measuring jitters in the packets;
    a judging portion for judging whether or not the jitters of the packets can be absorbed with an accumulation capacity of the jitter buffer;
    a determining portion for determining levels of importance of the packets; and
    a control portion for performing reproduction processing or discarding processing on a packet, among the packets accumulated in the jitter buffer, having jitters that cannot be absorbed with the accumulation capacity of the jitter buffer, depending on a level of importance of the packet, wherein the control portion performs reproduction processing when a packet has jitter that cannot be absorbed with the accumulation capacity of the jitter buffer and a high importance, without discarding the packet,
    wherein when power variation characteristics of the packet have a value larger or equal to a first threshold and a power of the packet has a value larger or equal to a second threshold, then the level of importance of the packet is determined as being high;
    when the power variation characteristics of the packet have a value larger or equal to the first threshold and the power of the packet has a value smaller than the second threshold, then the level of importance of the packet is determined as being low;
    when the power variation characteristics of the packet have a value smaller than the first threshold, the power of the packet has a value larger or equal to the second threshold, and the packet has no pitch characteristics, then the level of importance of the packet is determined as being high;
    when the power variation characteristics of the packet have a value smaller than the first threshold, the power of the packet has a value larger or equal to the second threshold, and the packet has pitch characteristics, then the level of importance of the packet is determined as being low;
    the packet with a pitch gain equal to or above a third predetermined threshold is determined as having pitch characteristics, and
    the packet with a pitch gain less than the third predetermined threshold is determined as having no pitch characteristics.

2. The jitter buffer controller according to claim 1, in which the control portion performs discarding processing on the packet having jitters that cannot be absorbed with the accumulation capacity of the jitter buffer, when the packet has low importance.

3. The jitter buffer controller according to claim 1, further including an accumulation capacity determining portion for determining a packet accumulation capacity in accordance with a jitter distribution obtained by the measuring portion relating to a plurality of packets;
    in which the control portion replicates or discards, in accordance with the packet accumulation capacity determined, packets attached with low importance.

4. The jitter buffer controller according to claim 3, in which the control portion performs reproduction processing on a packet without replicating or discarding the packet, the packet being read out from the jitter buffer following a packet that is replicated or discarded.

5. The jitter buffer controller according to claim 4, in which an orthogonal transformation is performed on a decoded voice signal, and a level of importance of the voice signal is determined based on variation in Spectral Power.

6. The jitter buffer controller according to claim 1, further including:
    an accumulation capacity determining portion for determining a packet accumulation capacity in accordance with a jitter distribution obtained by the measuring portion relating to a plurality of packets; and
    a silence determining portion for determining whether a packet accumulated in the jitter buffer contains silence or not, in which
    the control portion replicates packets of low importance or of silence when the accumulation capacity determining portion decides to increase the packet accumulation capacity.

7. The jitter buffer controller according to claim 6, in which the control portion discards packets of silence when the accumulation capacity determining portion decides to decrease the packet accumulation capacity.

8. The jitter buffer controller according to claim 1, in which the determining portion determines levels of importance of packets based on encoded voice data included in the packets.

9. The jitter buffer controller according to claim 1, in which the determining portion determines levels of importance of packets using voice signals obtained by decoding encoded voice data included in the packets.

10. A jitter buffer control method for controlling a jitter buffer in which packets are accumulated, the method including the steps of:
    measuring jitters in the packets;
    judging whether or not the jitters of the packets can be absorbed with an accumulation capacity of the jitter buffer;
    determining levels of importance of the packets, wherein
    when power variation characteristics of the packet have a value larger or equal to a first threshold and a power of the packet has a value larger or equal to a second threshold, then the level of importance is of the packet determined as being high;
    when the power variation characteristics of the packet have a value larger or equal to the first threshold and the power of the packet has a value smaller than the second threshold, then the level of importance of the packet is determined as being low;
    when the power variation characteristics of the packet have a value smaller than the first threshold, the power of the packet has a value larger or equal to the second threshold, and the packet has no pitch characteristics, then the level of importance of the packet is determined as being high;
    when the power variation characteristics of the packet have a value smaller than the first threshold, the power of the packet has a value larger or equal to the second threshold, and the packet has pitch characteristics, then the level of importance of the packet is determined as being low;
    the packet with a pitch gain equal to or above a third predetermined threshold is determined as having pitch characteristics, and the packet with a pitch gain less than the third predetermined threshold is determined as having no pitch characteristics;

performing reproduction processing or discarding processing on a packet, among the packets accumulated in the jitter buffer, having jitters that cannot be absorbed with the accumulation capacity of the jitter buffer, depending on the importance of the packet, and performing reproduction processing when a packet has jitter that cannot be absorbed with the accumulation capacity of the jitter buffer and a high importance, without discarding the packet.

11. The jitter buffer control method according to claim 10, further including the step of performing discarding processing on the packet having jitter that cannot be absorbed with the accumulation capacity of the jitter buffer, when the packet is attached with low importance.

12. The jitter buffer control method according to claim 10, further including the steps of:

determining a packet accumulation capacity in accordance with a jitter distribution obtained relating to a plurality of packets; and replicating or discarding, in accordance with the packet accumulation capacity determined, packets attached with low importance.

13. The jitter buffer control method according to claim 12, further including the step of performing reproduction processing on a packet without replicating or discarding the packet, the packet being read out from the jitter buffer following to a packet that is replicated or discarded.

14. The jitter buffer control method according to claim 10, further including the steps of:

determining a packet accumulation capacity in accordance with a jitter distribution obtained relating to a plurality of packets;

judging whether a packet, among the packets accumulated in the jitter buffer, contains silence or not; and replicating packets of low importance or of silence when the packet accumulation capacity is to be increased in line with the packet accumulation capacity that is decided in accordance with the jitter distribution obtained relating to the plurality of packets.

15. The jitter buffer control method according to claim 14, further including the step of discarding a packet of silence when the packet accumulation capacity is to be decreased in line with the packet accumulation capacity that is decided in accordance with the jitter distribution obtained relating to a the plurality of packets.

16. The jitter control method according to claim 10, further including the step of determining a level of importance of a packet based on encoded voice data included in the packet.

* * * * *